United States Patent
Karhuketo

Patent Number: 6,080,478
Date of Patent: *Jun. 27, 2000

[54] BIODEGRADABLE MULTILAYER MATERIAL

[75] Inventor: Hannu Karhuketo, Valkeakoski, Finland

[73] Assignee: UPM Kymmene Corporation, Helsinki, Finland

[*] Notice: This patent is subject to a terminal disclaimer.

[21] Appl. No.: 08/952,902

[22] PCT Filed: Mar. 24, 1997

[86] PCT No.: PCT/FI97/00184

§ 371 Date: Mar. 5, 1998

§ 102(e) Date: Mar. 5, 1998

[87] PCT Pub. No.: WO97/37848

PCT Pub. Date: Oct. 16, 1997

[30] Foreign Application Priority Data

Apr. 4, 1996 [FI] Finland ..................................... 961543

[51] Int. Cl.$^7$ ........................... B32B 27/10; B32B 27/36; B29C 47/06
[52] U.S. Cl. ........................ 428/340; 428/480; 428/481; 156/244.11; 156/244.22; 156/244.27
[58] Field of Search ..................................... 428/480, 481, 428/340; 156/244.11, 244.22, 244.27

[56] References Cited

U.S. PATENT DOCUMENTS 5,444,113  8/1995  Sinclair et al. .......................... 524/306
5,502,158  3/1996  Sinclair et al. .......................... 528/354

FOREIGN PATENT DOCUMENTS

| 0 514 137 A3 | of 1992 | European Pat. Off. . |
| 0 534 471 A1 | of 1993 | European Pat. Off. . |
| 0 603 876 A1 | of 1994 | European Pat. Off. . |
| 44 30 415 A1 | of 1996 | Germany . |
| WO 94/06866 | of 1994 | WIPO . |
| WO 94/28070 | of 1994 | WIPO . |
| WO 96/31303 | of 1996 | WIPO . |

OTHER PUBLICATIONS

Derwent Accession No. 96–236165, Toyobo KK—Biodegradable polyester adhesives having stable quality and good water resistance–contains biodegradable polyester contg. lactic acid residue and caprolactone residue, JP,A,8092359, 960409, DW9624.

Derwent Accession No. 94–114861, Toppan Printing Co. Ltd—Biodegradable paper container–comprises paper laminate with biodegradable plastic layer, JP,A,6064111, 940308, DW9414.

*Primary Examiner*—Paul Thibodeau
*Assistant Examiner*—Ramsey Zacharia
*Attorney, Agent, or Firm*—Pollock, Vande Sande & Amernick, R.L.L.P.

[57] ABSTRACT

A multi-layer material including a cellulose-based naturally decomposing basic layer, at least one polyhydroxyalkanoate layer on the basic layer and at least one biodegradable polylactide layer between the basic layer and the at least one polyhydroxyalkanoate layer.

21 Claims, 1 Drawing Sheet

BIODEGRADABLE MULTILAYER MATERIAL

FIELD OF THE INVENTION

The invention relates to a layer material.

BACKGROUND OF THE INVENTION

It is known to make packaging laminates by combining a cellulose-based, naturally decomposing basic layer with layers of biodegradable plastic which improve the tightness of the basic layer. This way total compostability of the material in the waste management of the packaging material can be achieved.

From the European application publication 534471, for example, a biodegradable laminate used as packaging material is known. This laminate consists of polyhydroxybutyrate-based copolymer, more precisely hydroxybutyric-hydroxyvaleric copolyester (HB/HV) coextruded together with a polyethylene film on a cellulose-based sheet. The polyethylene film is used as an auxiliary film in the coextrusion process, and after the process it is pulled of the laminate leaving the hydroxybutyric/hydroxyvaleric film attached to the sheet.

The biodegradable polymer in question has good barrier properties (barrier layer properties) in itself and is therefore a popular laminating agent, and it can be used to increase the tightness of cellulose-based basic materials noticeably.

In addition, the European application publication 603876 introduces the use of hydroxybutiric/hydroxyvaleric copolymer layers as water vapor barrier on both sides of an oxygen barrier layer of polyvinyl alcohol. The layers are laminated either on one side or both with a layer of cellulosic derivative or paper.

The multi layer structure in question does not provide satisfactory properties. Polyvinyl alcohol tends to dissolve in water which makes it difficult to be used under conditions of considerable humidity. Furthermore, the coextrusion of these materials is in practice difficult. And finally, polyvinyl alcohol is poorly compostible, in other words it is not biodegradable in the strict sense of the word.

SUMMARY OF THE INVENTION

The purpose of the present invention is to provide a layer material which exhibits improvements to the aforementioned properties and which can be used as airtight and biodegradable packaging materials. To achieve this purpose, the layer material is primarily characterized below.

The invention combines the excellent properties of polyhydroxyalkanoate and polylactide.

By using two separate polyhydroxyalkanoate layers, such as polyhydroxybutyric-based layers, particularly hydroxybutyric-hydroxyvaleric copolymer layers, good barrier properties can be achieved with layers of great thinness, even of only micrometers thick, when they are combined with polylactic acid, i.e. polylactide (PLA) which improves the processability of the material. Polylactide exhibits good adhesion properties and it does not stick to the surface of the chill roll in coextrusion which means that also the coextrusion chances of the hydroxybutyric/hydroxyvaleric copolymers are improved, among other things edge weaving is reduced and the nucleant can be omitted.

The use of two separate polyhydroxyalkanoate layers ensures that the microscopic pinholes which may develop to the layers are not formed at the same spot, which improves barrier properties.

Because of the plastic layer structure described, the gas and grease tightness are improved, and better resistance to folding and creasing can be achieved.

BRIEF DESCRIPTION OF THE DRAWINGS

The invention is described in more detail in the following with reference to the accompanying drawings in which.

DETAILED DESCRIPTION OF THE INVENTION

Figure 1:
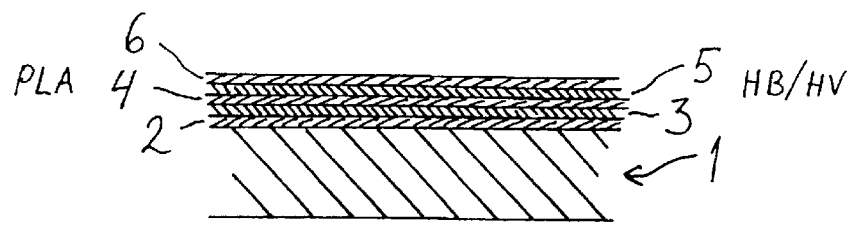
FIG. 1 shows a schematic view of the layer material according to the invention.

FIG. 1 includes a cellulose-based and naturally decomposing basic layer 1, which gives the product its strength, the basis weight of which may vary within the known values for paper and cardboard. Laminated on top of the basic layer 1 by coextrusion, are the following layers starting from the basic layer 1: A polylactide layer 2 (PLA) which attaches the other plastic layers to the basic layer by adhesion, a hydroxybutyric/hydroxyvaleric copolymer layer 3 (HB/HV), a polylactide layer 4, a hydroxybutyric/hydroxyvaleric copolymer layer 5 and a polylactide layer 6 which forms the outer layer. As is apparent from the aforesaid, all the plastic layers are biodegradable which in this case denotes that their polymer structures are naturally such that the polymer chains degrade under compost conditions. The layer material can be used as a packaging material for purposes when the escape of water vapor, oxygen or aroma is wished to be prevented, particularly for the packaging of food stuffs, cosmetics and industrial chemicals.

The polylactide layer 4 in the middle also attaches the HB/HV layers 3 and 5, which act as barrier layers, to each other.

The HB/WV layers 3 and 5 can be formed very thin, and their barrier properties as separate layers are better than those of a uniform layer of the same total thickness.

Due to the aforesaid properties, the HB/HV qualities may be more freely selected.

The heat-sealing properties of the outermost PLA layer may be utilized in forming food stuff packaging containers or in attaching additional layers to the material. A further good property of polylactide is its inexpensiveness.

By using polylactide (PLA) and HB/HV copolymer together as several separate layers (3 layers of PLA and 2 layer of HB/HV), the good adhesion and surface properties of the first and the good barrier properties of the latter can be utilized efficienty. The plastic layers are usually in contact with the packaged product. It is also possible to further add the same layers to the layer material in FIG. 1 so that they succeed one another by turns as described. On the other hand, the outermost PLA layer 6 can be omitted, in which case the layer 5 forms the outer layer. This is suitable for liquid packaging containers because of the good water resistance of HB/HV or its equivalent. If the outer layer is PLA it is suitable to the packaging of greasy food stuffs.

In layers 3 and 5, other polyhydroxyalkanoate may also be used, preferably polyhydroxybutyrate (PHB) or its copolymer with another hydroxyalkanoate, such as the aforementioned HB/HV.

The hydroxybutyric/hydroxyvaleric copolymer may be, for example, one with 92% of hydroxybutyric units and 8% of hydroxyvaleric units, which is sold under the trade name "BIOPOL" by Zeneca Ltd. The number of hydroxyvaleric units in the copolymer may vary, and it may be within, for example, the range 1–20 p-%.

In principle it would be possible to replace the layers 3 and 5 with only one polyhydroxyalkanoate layer mentioned above, in which case the structure in FIG. 1 would be a three-layer structure.

The basic layer 1 may be paper used in food stuff packaging containers, cardboard or preferably greaseproof paper which has good grease and aroma tightness, for example 100–600 s as Linden tightness. The basis weight of the basic layer may vary considerably, for example in the range 30–500 g/m².

Figure 2:
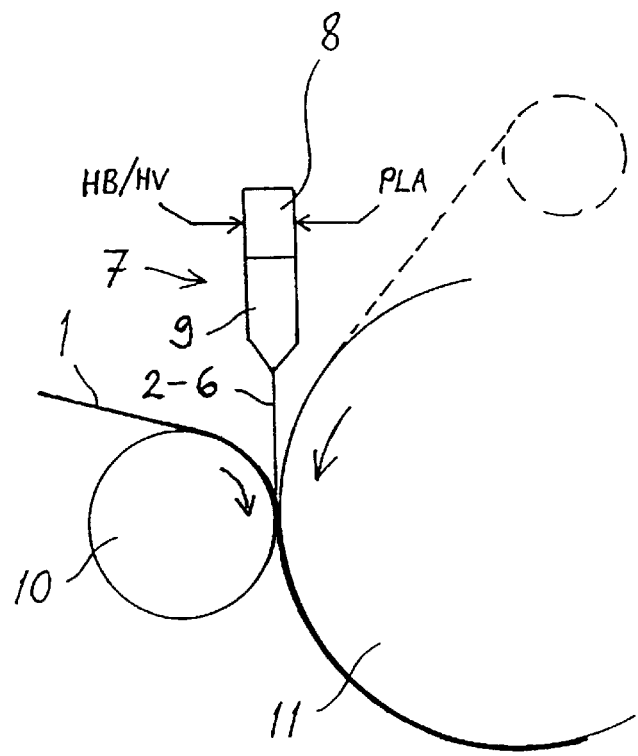
FIG. 2 shows the process for manufacturing the material.

FIG. 2 shows the principle for manufacturing the layer material. The coextruder 7 comprises a feed block 8 into which the aforesaid two biodegradable polymer materials are fed (marked with letters HB/HV and PLA). The feed block arranges the materials into five layers one on top of each other, after which the forming die 9 spreads them into a film of full-width which is lead into the nip between the press roll 10 and the control roll 11, into which nip the material forming the basic layer 1 is brought from its own roll. The finished layer material is lead along the surface of the control roll 11 to further processing. In the drawing, a possibility to add an additional layer on top of the plastic layer comprised of layers 2–6 is marked with a dotted line, the additional layer being preferably also a cellulose-based naturally decomposing material. In this case, there could be a thinner paper on one side of the plastic layers and a thicker packaging cardboard on the other side.

What is claimed is:

1. A multi-layer material, comprising:
   a cellulosic naturally decomposing basic layer;
   at least one polyhydroxyalkanoate layer on the basic layer; and
   at least one biodegradable polylactide layer between the basic layer and the at least one polyhydroxyalkanoate layer.

2. The multi-layer material according to claim 1, further comprising:
   an outer layer of biodegradable polylactide on an outermost polyhydroxyalkanoate layer.

3. The multi-layer material according to claim 2, wherein the material comprises two polyhydroxyalkanoate layers and three polylactide layers.

4. The multi-layer material according to claim 3, wherein the polyhydroxyalkanoate is a hydroxybutyric/hydroxyvaleric copolymer.

5. The multi-layer material according to claim 2, wherein the polyhydroxyalkanoate is a hydroxybutyric/hydroxyvaleric copolymer.

6. The multi-layer material according to claim 2, further comprising:
   a cellulosic layer on the outer biodegradable polylactide layer.

7. The multi-layer material according to claim 1, wherein the at least one polyhydroxyalkanoate layer and the at least one polylactide layer are formed on the basic layer by coextrusion.

8. The multi-layer material according to claim 7, wherein the polyhydroxyalkanoate is a hydroxybutyric/hydroxyvaleric copolymer.

9. The multi-layer material according to claim 7, wherein the cellulosic basic layer comprises paper or cardboard.

10. The multi-layer material according to claim 1, wherein the polyhydroxyalkanoate is a hydroxybutyric/hydroxyvaleric copolymer.

11. The multi-layer material according to claim 8, wherein the hydroxybutyric/hydroxyvaleric copolymer comprises 92% hydroxybutyric units and 8% hydroxyvaleric units.

12. The multi-layer material according to claim 10, wherein the hydroxybutyric/hydroxyvaleric copolymer comprises 1% to 20% hydroxyvaleric units.

13. The multi-layer material according to claim 1, wherein the material has a Linden tightness of 100–600 s.

14. The multi-layer material according to claim 1, wherein the basic layer has a basis weight of 30 g/m² to 500 g/m².

15. The multi-layer material according to claim 11, further comprising:
   a cellulosic layer on the at least one polyhydroxyalkanoate layer.

16. A method for forming a multi-layer structure, the method comprising:
   providing a basic cellulosic layer;
   attaching at least one polyhydroxyalkanoate layer on the basic layer; and
   attaching at least one biodegradable polylactide layer between the basic layer and the at least one polyhydroxyalkanoate layer.

17. The method according to claim 16, wherein the at least one polyhydroxyalkanoate layer and the at least one biodegradable polylactide layer are provided by coextrusion.

18. The method according to claim 16, further comprising:
   attaching an outer layer of biodegradable polylactide on an outermost polyhydroxyalkanoate layer.

19. The method according to claim 18, wherein two polyhydroxyalkanoate layers and three polylactide layers are attaching.

20. The method according to claim 18, further comprising:
   attaching a cellulosic layer on the outer biodegradable polylactide layer.

21. The method according to claim 16, further comprising:
   attaching a cellulosic layer on the outer biodegradable polylactide layer.

* * * * *